(12) United States Patent
Lee et al.

(10) Patent No.: US 10,345,605 B2
(45) Date of Patent: Jul. 9, 2019

(54) CLOAKING DEVICES CONSTRUCTED FROM POLYHEDRONS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Chengang Ji, Ann Arbor, MI (US); Songtao Wu, Ann Arbor, MI (US); Debasish Banerjee, Ann Arbor, MI (US)

(73) Assignee: Toyota Motor Engineering & Manufacturing North America, Plano, TX (US)

( * ) Notice: Subject to any disclaimer, the term of this patent is extended or adjusted under 35 U.S.C. 154(b) by 0 days.

(21) Appl. No.: 15/813,845

(22) Filed: Nov. 15, 2017

(65) Prior Publication Data

US 2019/0146229 A1    May 16, 2019

(51) Int. Cl.
*G02B 27/14*    (2006.01)
*B60R 13/02*    (2006.01)
(Continued)

(52) U.S. Cl.
CPC ............... *G02B 27/14* (2013.01); *B60R 1/10* (2013.01); *B60R 13/025* (2013.01); *B62D 25/04* (2013.01); *B60R 2013/0287* (2013.01)

(58) Field of Classification Search
CPC ...... G02B 27/10; G02B 27/14; G02B 27/017; G02B 27/126; G02B 27/0172;
(Continued)

(56) References Cited

U.S. PATENT DOCUMENTS 5,694,260 A * 12/1997 Houston .............. G02B 27/106
                                                    359/471
9,405,118 B1    8/2016 Lu
(Continued)

FOREIGN PATENT DOCUMENTS

CN    201681201 U    12/2010
CN    103287340 A    9/2013
CN    104590127 A    5/2015

OTHER PUBLICATIONS

Starr, Michelle, "'Invisibility cloak' uses lenses to bend light", CNET, Sep. 28, 2014; URL: https://www.cnet.com/news/invisibility-cloak-uses-lenses-to-bend-light/.
(Continued)

*Primary Examiner* — Sultan Chowdhury
(74) *Attorney, Agent, or Firm* — Dinsmore & Shohl LLP (57) ABSTRACT

A cloaking device includes an object-side, an image-side and a cloaked region between the object-side and the image-side. An object-side polyhedron with an entrance side and an exit side parallel to the entrance side is positioned on the object-side and an image-side polyhedron with an entrance side and an exit side parallel to the entrance side is positioned on the image-side. The entrance side of the object-side polyhedron is oriented relative to a reference optical axis extending between the object-side and the image-side at an acute angle α and the exit side of the image-side polyhedron is oriented relative to the reference optical axis at an oblique angle equal to 180°−α. Light from an object positioned on the object-side of the cloaking device is redirected around the cloaked region, without total internal reflection of the light within the object-side polyhedron or the image-side polyhedron.

20 Claims, 7 Drawing Sheets

(51) Int. Cl.
  *B60R 1/10* (2006.01)
  *B62D 25/04* (2006.01)
(58) Field of Classification Search
  CPC ........ G02B 27/283; G02B 5/04; G02B 5/045;
        G02B 5/08; G02B 5/09; G02B 5/201;
      G02B 5/3083; B60R 1/007; B60R 1/10;
                  B60R 1/082
  See application file for complete search history.

(56) References Cited

U.S. PATENT DOCUMENTS

| | | |
|---|---|---|
| 9,557,547 B2 | 1/2017 | Choi et al. |
| 9,971,161 B2* | 5/2018 | Chen ..................... H01Q 15/08 |
| 2016/0267720 A1* | 9/2016 | Mandella .............. G06T 19/006 |
| 2017/0113617 A1 | 4/2017 | Obata et al. |
| 2017/0227781 A1 | 8/2017 | Banerjee et al. |

OTHER PUBLICATIONS

"Physics demonstrations: cloaking device?", Apr. 25, 2013; URL: https://skullsinthestars.com/2013/04/25/physics-demonstrations-cloaking-device/.

* cited by examiner

CLOAKING DEVICES CONSTRUCTED FROM POLYHEDRONS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region between the object-side and the image-side, and a reference optical axis extending from the object-side to the image-side. An object-side polyhedron with a light entrance side and a light exit side parallel to the light entrance side is positioned on the object-side, and an image-side polyhedron with a light entrance side and a light exit side parallel to the light entrance side is positioned on the image-side. The light entrance side of the object-side polyhedron is oriented relative to the reference optical axis at an acute angle $\alpha$ and the light exit side of the image-side polyhedron is oriented relative to the reference optical axis at an oblique angle equal to $180°-\alpha$. Also, the light entrance side of the image-side polyhedron is spaced apart from and oriented relative to the light exit side of the object-side polyhedron at an angle equal to $180°-2\alpha$. Light from an object positioned on the object-side of the cloaking device and obscured by the cloaked region from the image-side is redirected around the cloaked region via propagation of the light through the object-side polyhedron to the image-side polyhedron and through the image-side polyhedron forming an image of the object on the image-side of the cloaking device such that the light from the object appears to pass through the cloaked region. In some embodiments, cross-sections along height directions of the object-side polyhedron and the image-side polyhedron are in the form of parallelograms. In such embodiments, the object-side polyhedron and the image-side polyhedron may be hexahedrons, for example parallelepipeds.

In embodiments, light propagates through the object-side polyhedron and the image-side polyhedron without total internal reflection there within. Light from the object on the object-side propagates to the image-side to form the image via the optical path: object to light entrance side of the object-side polyhedron; light entrance side of the object-side polyhedron to light exit side of the object-side polyhedron; light exit side of the object-side polyhedron to light entrance side of the image-side polyhedron; light entrance side of the image-side polyhedron to light exit side of the image-side polyhedron; and light exit side of the image-side polyhedron to image on the image-side.

According to another embodiment, a vehicle includes an A-pillar and a cloaking device positioned on the A-pillar. The cloaking device includes an object-side, an image-side, a cloaked region, a reference optical axis extending from the object-side to the image-side, and the A-pillar is positioned within the cloaked region. The object-side is positioned on an exterior of the vehicle and the image-side is positioned within an interior of the vehicle. An object-side polyhedron with a light entrance side and a light exit side parallel to the light entrance side is positioned on the object-side of the cloaking device, and an image-side polyhedron with a light entrance side and a light exit side parallel to the light entrance side is positioned on the image-side. The light entrance side of the object-side polyhedron is oriented relative to the reference optical axis at an acute angle $\alpha$ and the light exit side of the image-side polyhedron is oriented relative to the reference optical axis at an oblique angle equal to $180°-\alpha$. The light entrance side of the image-side polyhedron may be spaced apart from and be oriented relative to the light exit side of the object-side polyhedron at an angle equal to $180°-2\alpha$. Cross-sections along height directions of the object-side polyhedron and the image-side polyhedron may be in the form of two parallelograms. In some embodiments, light from the object positioned on the object-side of the cloaking device is redirected around the A-pillar and forms the image of the object on the image-side of the cloaking device without total internal reflection of the light within the object-side polyhedron and the image-side polyhedron. In such embodiments, light from the object on the object-side propagates to the image-side to form an image via the optical path: object to light entrance side of the object-side polyhedron; light entrance side of the object-side polyhedron to light exit side of the object-side polyhedron; light exit side of the object-side polyhedron to light entrance side of the image-side polyhedron; light entrance side of the image-side polyhedron to light exit side of the image-side polyhedron; and light exit side of the image-side polyhedron to image on the image-side.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of transparent polyhedrons (referred to herein simply as "polyhedrons" or "polyhedron") positioned around a cloaked region that refract light, without total internal reflection within the plurality of polyhedrons, around a cloaked region. The cloaking devices described herein may be used to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. The utilization of the polyhedrons allows a driver to perceive an image which, if not for the cloaking device, would be obstructed by a pillar of the vehicle. Various embodiments of cloaking devices and vehicles comprising the same will be described in further detail herein with specific reference to the appended drawings.

Figure 1:
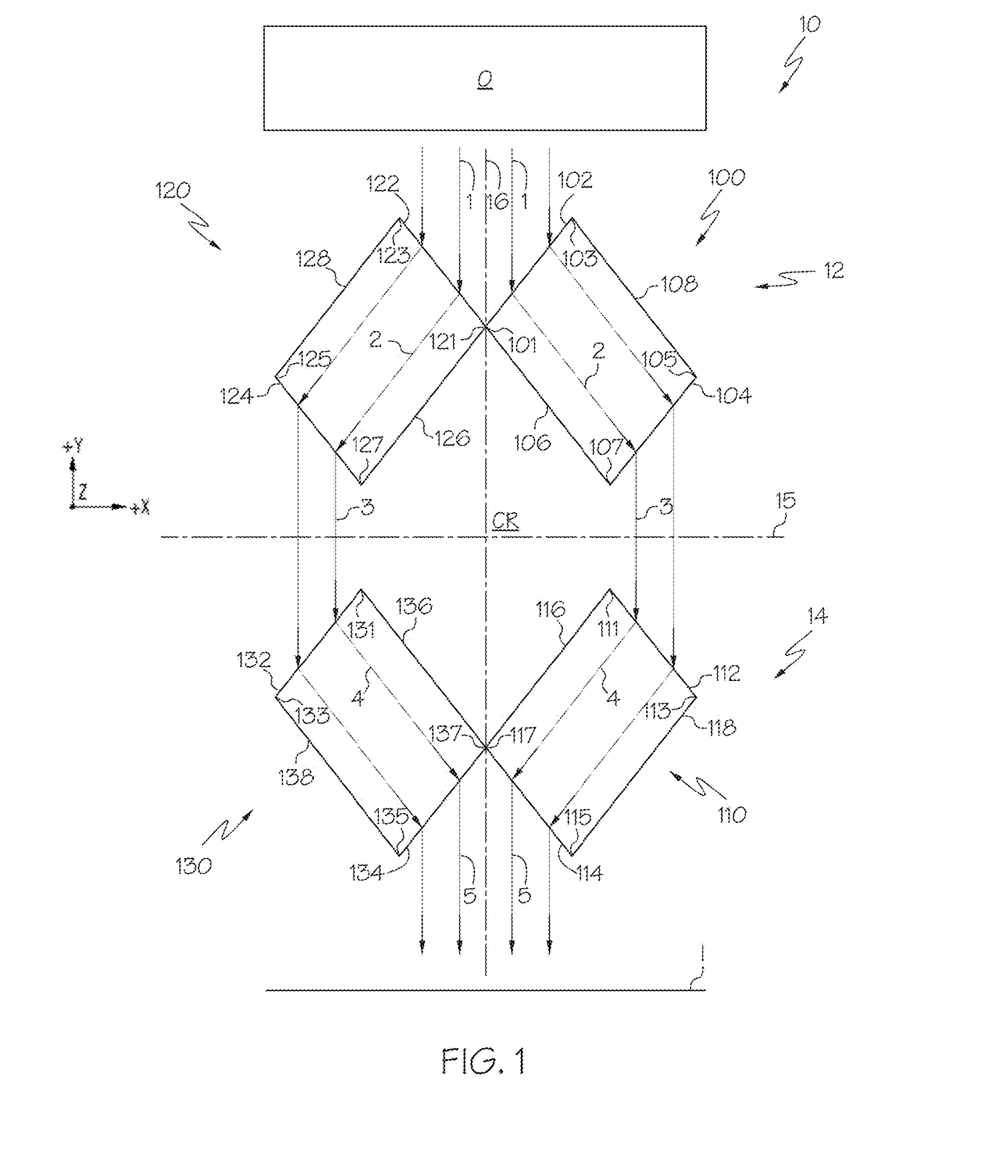
FIG. 1 schematically depicts a top view of a cloaking device according to one or more embodiments described and illustrated herein.

FIG. 1 generally depicts one embodiment of a cloaking device. The cloaking device includes an object-side, an image-side, a cloaked region, a reference optical axis extending between the object-side and the image-side, an object-side polyhedron and an image-side polyhedron. The object-side and the image-side polyhedrons each include a light entrance side and a light exit side parallel to the light entrance side. That is, the light entrance side and the light exit side extend parallel to each other. The light entrance side of the object-side polyhedron is oriented relative to the reference optical axis at an acute angle α and the light exit side of the image-side polyhedron is oriented relative to the reference optical axis at an obtuse angle equal to 180°−α. Light from an object on the object-side of the cloaking device propagates to the image-side, and is "bent" around the cloaked region, by being refracted by and propagating through the polyhedrons. Light from the object on the object-side of the cloaking device and obscured by the cloaked region from the image-side is refracted around the cloaked region and forms an image of the object on the image-side by propagating along an optical path. The optical path includes object to object-side polyhedron, object-side polyhedron to image-side polyhedron, image-side polyhedron to image. Accordingly, an individual will see the object located on the opposite side of the cloaked region (and thus on the opposite side of a cloaked article) giving the visual impression that the cloaked article is transparent.

Still referring to FIG. 1, a cloaking assembly 10 may include four polyhedrons 100, 110, 120, 130 positioned around a cloaked region 'CR' with a cross-section of the four polyhedrons 100, 110, 120, 130 normal to a height direction of the four polyhedrons 100, 110, 120, 130 depicted in the figures. As used herein, the term "height direction" refers to the direction depicted by the Z-axis in the figures. A bisecting axis 15 generally divides or designates an object-side 12 and an image-side 14 of the cloaking assembly 10. The two polyhedrons 100, 120 are positioned on the object-side 12 of the cloaking assembly 10, i.e., above (+Y direction) the bisecting axis 15 and the two polyhedrons 110, 130 are positioned on the image-side 14 of the cloaking assembly 10, i.e., below (−Y direction) the bisecting axis 15. Polyhedron 100 is referred to herein as a first object-side polyhedron 100 and polyhedron 120 is referred to as a second object-side polyhedron 120. Polyhedron 110 is referred to as a first image-side polyhedron 110 and polyhedron 130 is referred to as a second image-side polyhedron 130. A reference optical axis 16 extends from the object-side 12 to the image-side 14 of the cloaking assembly 10. The first object-side polyhedron 100 and the first image-side polyhedron 110 are positioned on a first side (+X direction) of the reference optical axis 16, and the second object-side polyhedron 120 and the second image-side polyhedron 130 are positioned on a second side (−X direction) of the reference optical axis 16 opposite the first side.

The first object-side polyhedron 100 includes a light entrance side 102 and a light exit side 104. As discussed herein, the term "light entrance side" refers to a side of a polyhedron where light propagating from an object-side to an image-side of a cloaking assembly (−Y direction) enters the polyhedron and the term "light exit side" refers to a side of the polyhedron where the light exits the polyhedron. Extending between the light entrance side 102 and the light exit side 104 is an inward facing side 106 and outward facing side 108. As discussed herein, the term "inward facing side" refers to a side of a polyhedron extending between a light entrance side and a light exit side with an outer surface that faces towards the CR and the term "outward facing side" refers to a side of a polyhedron extending between a light entrance side and a light exit side with an outer surface that faces away from the CR. In embodiments, the inward facing side 106 and/or the outward facing side 108, and other inward facing sides and/or outward facing sides described herein, may be opaque surfaces so as to prevent undesired light from propagating into the first object-side polyhedron 100, and other polyhedrons described herein. A plane defined by the light entrance side 102 and a plane defined by the inward facing side 106 intersect at a line 101 extending in the Z-direction, and a plane defined by the light entrance side 102 and a plane defined by the outward facing side 108 intersect at a line 103 extending in the Z-direction. A plane defined by the light exit side 104 and a plane defined by the outward facing side 108 intersect at a line 105 extending in the Z-direction, and a plane defined by the light exit side 104 and a plane defined by the inward facing side 106 intersect at a line 107 extending in the Z-direction.

The first object-side polyhedron 100, and other polyhedrons described herein, have a width direction defined by an axis extending parallel to a light entrance side of a given polyhedron and lying within an X-Y plane depicted in the figures, and a length direction defined by an axis extending parallel to an inward facing side of a given polyhedron and lying within an X-Y plane.

The first image-side polyhedron 110 includes a light entrance side 112 and a light exit side 114. Extending between the light entrance side 112 and the light exit side 114 is an inward facing side 116 and outward facing side 118. A plane defined by the light entrance side 112 and a plane defined by the inward facing side 116 intersect at a line 111 extending in the Z-direction, and a plane defined by the light entrance side 112 and a plane defined by the outward facing side 118 intersect at a line 113 extending in the Z-direction. A plane defined by the light exit side 114 and a plane defined by the outward facing side 118 intersect at a line 115 extending in the Z-direction, and a plane defined by the light exit side 114 and a plane defined by the inward facing side 116 intersect at a line 117 extending in the Z-direction.

The second object-side polyhedron 120 includes a light entrance side 122 and a light exit side 124. Extending between the light entrance side 122 and the light exit side 124 is an inward facing side 126 and outward facing side 128. A plane defined by the light entrance side 122 and a plane defined by the inward facing side 126 intersect at a line 121 extending in the Z-direction, and a plane defined by the light entrance side 122 and a plane defined by the outward facing side 128 intersect at a line 123 extending in the Z-direction. A plane defined by the light exit side 124 and a plane defined by the outward facing side 128 intersect at a line 125 extending in the Z-direction, and a plane defined by the light exit side 124 and a plane defined by the inward facing side 126 intersect at a line 127 extending in the Z-direction.

The second image-side polyhedron 130 includes a light entrance side 132 and a light exit side 134. Extending between the light entrance side 132 and the light exit side 134 is an inward facing side 136 and outward facing side 138. A plane defined by the light entrance side 132 and a plane defined by the inward facing side 136 intersect at a line 131 extending in the Z-direction, and a plane defined by the light entrance side 132 and a plane defined by the outward facing side 138 intersect at a line 133 extending in the Z-direction. A plane defined by the light exit side 134 and a plane defined by the outward facing side 138 intersect at a line 135 extending in the Z-direction, and a plane defined by the light exit side 134 and a plane defined by the inward facing side 136 intersect at a line 137 extending in the Z-direction.

Figure 2:
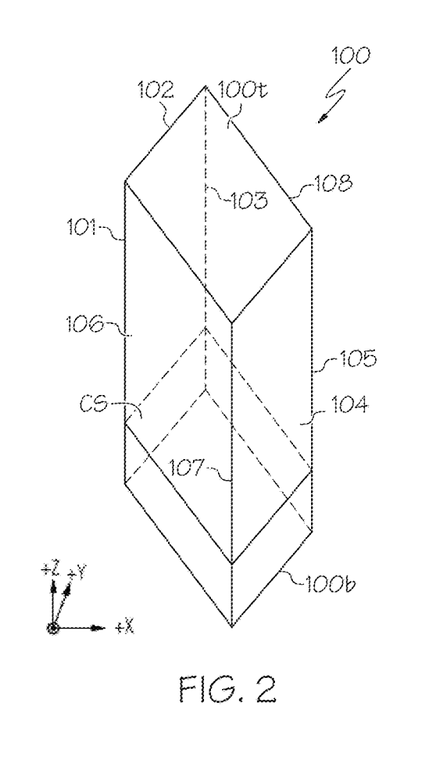
FIG. 2 schematically depicts a top perspective view of a polyhedron in FIG. 1.

Referring to FIG. 2, a top perspective view of the first object-side polyhedron 100 in the form of a hexahedron is shown. That is, in embodiments, the polyhedrons 100, 110, 120, 130 may be polyhedrons with six sides. In the alternative, one or more of the polyhedrons 100, 110, 120, 130 may not be polyhedrons with six sides so long as the light exit side parallel to the light entrance side. In embodiments where one or more of the polyhedrons 100, 110, 120, 130 is a hexahedron, the six sides include a light entrance side, a light exit side, an inward facing side, an outward facing side, a top side, and a bottom side. In such embodiments, one or more of the polyhedrons 100, 110, 120, 130 may be a parallelepiped with an inward facing surface parallel to an outward facing surface and a top surface parallel to a bottom surface. For example, the first object-side polyhedron 100 depicted in FIG. 2 includes the light entrance side 102, the light exit side 104 parallel to the light entrance side 102, the inward facing side 106, the outward facing side 108 parallel to the inward facing side 106, a top side 100t, and a bottom side 100b parallel to the top side 100t. A cross-section 'CS' normal to a height direction of the polyhedron 100 is a parallelogram as depicted in FIGS. 1 and 2. In embodiments, cross-sections of the polyhedrons 100, 110, 120, 130 normal to height directions thereof may comprise two or more equivalent parallelograms. As used herein, the term "equivalent parallelograms" refers to parallelograms with the same opposing acute angles, the same opposing obtuse angles, the same distance between the light entrance sides and the light exit sides, and the same distance between the inward facing sides and the outward facing sides. For example, cross-sections of the first object-side polyhedron 100 and the first image-side polyhedron 110 normal to height directions thereof may comprise two equivalent parallelograms. Similarly, cross-sections of the second object-side polyhedron 120 and the second image-side polyhedron 130 normal to height directions thereof may comprise two equivalent parallelograms. In embodiments, cross-sections of the polyhedrons 100, 110, 120, 130 normal to height directions thereof comprise four equivalent parallelograms. It should be understood that polyhedrons with cross-sections normal to height directions thereof comprising equivalent parallelograms may assist in uniformity of cloaking device design and/or structure, and reduce costs associated with the polyhedrons. In other embodiments, cross-sections of the polyhedrons 100, 110, 120, 130 normal to height directions thereof may not comprise four equivalent parallelograms. For example, the cross-section of the first object-side polyhedron 100 and the second object-side polyhedron 120 may not be equivalent parallelograms. In the alternative, or in addition to, the cross-section of the first image-side polyhedron 110 and the second image-side polyhedron 130 may not be equivalent parallelograms. It should be understood that polyhedrons with cross-sections normal to height directions thereof not comprising equivalent parallelograms may assist in flexibility in the cloaking device design and/or structure.

The polyhedrons 100, 110, 120, 130, and other polyhedrons described herein, may be formed from transparent materials that allow light to propagate there through. Non-limiting examples of materials that may be used to form the polyhedrons include indium tin oxide (ITO) glasses, dense flint (SF) glasses, lanthanum dense flint (LASF) glasses, and dielectric materials such as titanium oxide (TiO$_2$), zinc sulfide (ZnS), zinc selenide (ZnSe), zirconium oxide (ZrO$_2$), tantalum oxide (Ta$_2$O$_5$), zinc telluride (ZnTe), zinc oxide (ZnO), and silicon nitride (Si$_3$N$_4$).

Figure 3:
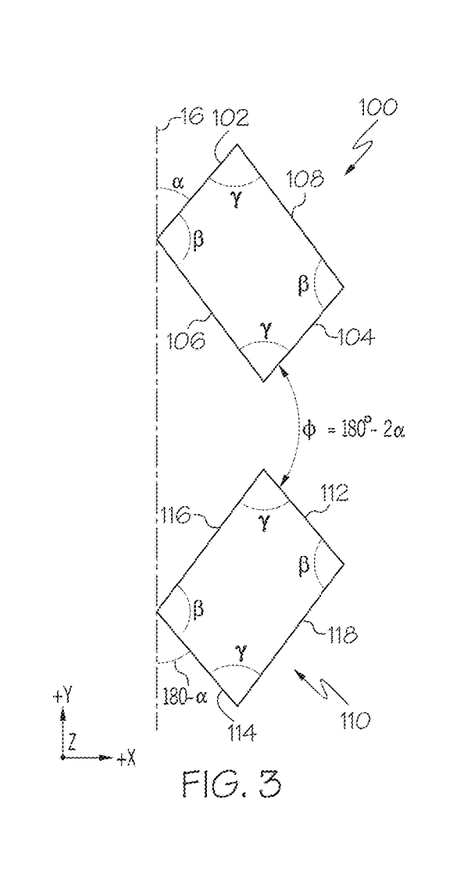
FIG. 3 schematically depicts a top view of a first object-side polyhedron and a first image-side polyhedron in FIG. 1.

Referring now to FIG. 3, angles of the first object-side polyhedron 100 and the first image-side polyhedron 110 are depicted. Particularly, the first object-side polyhedron 100 includes a pair of opposing acute angles γ and a pair of opposing obtuse angles β. Similarly, the first image-side polyhedron 110 includes a pair of opposing acute angles γ and a pair of opposing obtuse angles β. The pair of opposing acute angles γ of the first object-side polyhedron 100 are formed by the light entrance side 102 and the outward facing side 108, and the light exit side 104 and the inward facing side 106. The pair of opposing obtuse angles β of the first object-side polyhedron 100 are formed by the light entrance side 102 and the inward facing side 106, and the light exit side 104 and the outward facing side 108. The pair of opposing acute angles γ of the first image-side polyhedron 110 are formed by the light entrance side 112 and the inward facing side 116, and the light exit side 114 and the outward facing side 118. The pair of opposing obtuse angles β of the first image-side polyhedron 110 are formed by the light entrance side 112 and the outward facing side 118, and the light exit side 114 and the inward facing side 116. It should be understood that the second object-side polyhedron 120 (FIG. 1) and the second image-side polyhedron 130 may include the pair of opposing acute angles γ, and the pair of opposing obtuse angles β

The light entrance side 102 of the first object-side polyhedron 100 is oriented clockwise (CW) relative to the reference optical axis 16 at an angle α and the light exit side 114 of the first image-side polyhedron 110 is oriented CW relative to the reference optical axis 16 at an angle equal to 180°−α. Also, the light entrance side 112 of the first image-side polyhedron 110 is spaced apart from and oriented CW relative to the light exit side 104 of the first object-side polyhedron 100 at an angle equal to 180°-2α. In embodiments, an air gap (not labeled) is positioned between the light exit side 104 of the first object-side polyhedron 100 and the light entrance side 112 of the first image-side polyhedron 110. As used herein, the term "air gap" refers to a space between two polyhedrons occupied by a gas such as air. It should be understood that the light entrance side 122 of the second object-side polyhedron 120 may be oriented counter-clockwise (CCW) relative to the reference optical axis 16 at the angle α, the light exit side 134 of the second image-side polyhedron 130 may be oriented CCW relative to the reference optical axis 16 at an angle equal to 180°−α, and the light entrance side 132 of the second image-side polyhedron 130 is spaced apart from and oriented CCW relative to the light exit side 124 of the second object-side polyhedron 120 at an angle equal to 180°-2α. In embodiments, an air gap (not labeled) is positioned between the light exit side 124 of the second object-side polyhedron 120 and the light entrance side 132 of the second image-side polyhedron 130.

Figure 4:
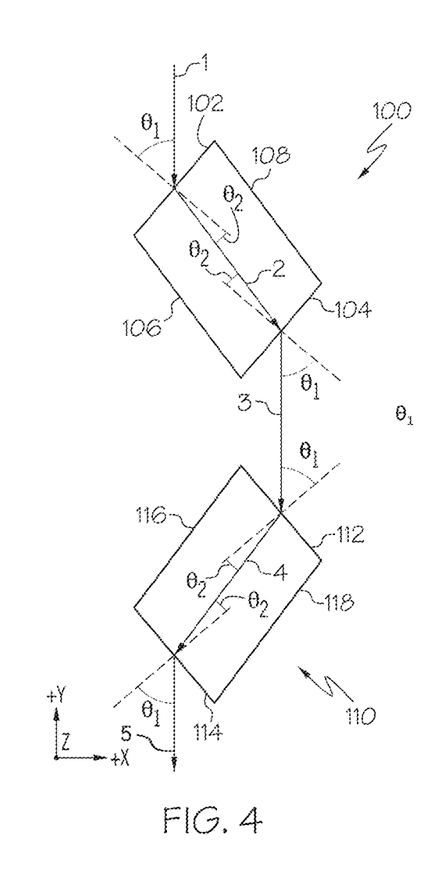
FIG. 4 schematically depicts a top view of a first object-side polyhedron and a first image-side polyhedron in FIG. 1.

Referring now to FIG. 4, angles for light refracted by the first object-side polyhedron 100 and the first image-side polyhedron 110 are depicted. Particularly, light from an object 'O' (FIG. 1) on the object-side 12 of the cloaking assembly 10 (shown as arrow '1') is incident on the light entrance side 102 at an angle θ$_1$ relative to a normal 102N of the light entrance side 102. Light 1 is refracted at the light entrance side 102 within the first object-side polyhedron 100 (shown as arrow '2') at an angle θ$_2$ relative to the normal 102N. The angles θ$_1$ and θ$_2$ may be defined according to Snell's law:

$$\frac{\sin\theta_1}{\sin\theta_2} = \frac{n_2}{n_1} \quad (1)$$

where n$_1$ is the index of refraction for air and n$_2$ is the index of refraction of the first object-side polyhedron 100, i.e., n$_2$ is the index of refraction for the material from which the first object-side polyhedron 100 is formed. In embodiments, the angle α is chosen such that light 1 is refracted and propagates as light 2 within the first object-side polyhedron 100 generally parallel to the inward facing side 106 and/or outward facing side 108. That is, light 2 propagates from the light entrance side 102 to the light exit side 104 without internal reflection within the first object-side polyhedron 100. Also, it should be understood that light may propagate from a light entrance side to a light exit side without internal reflection for other polyhedrons described herein. Since the light exit side 104 is parallel to the light entrance side 102, light 2 is incident on the light exit side 104 at the angle θ$_2$ relative to a normal 104N of the light exit side 104 and is refracted at the light exit side 104 at the angle θ$_1$ relative to the normal 104N (shown as arrow '3'). Accordingly, light 3 propagates parallel to light 1.

In embodiments, the first image-side polyhedron 110 is an equivalent polyhedron as the first object-side polyhedron 100. As used herein, the term "equivalent polyhedron" refers to polyhedrons with identical cross-sections taken normal to the height directions of each polyhedron. In such embodiments, light 3 is incident on the light entrance side 112 of the first image-side polyhedron 110 at the angle θ$_1$ relative to a normal 112N of the light entrance side 112. Also, in such embodiments, the first image-side polyhedron 110 may have the same index of refraction as the first object-side polyhedron 100 and light 3 is refracted at the light entrance side 112 within the first image-side polyhedron 110 (shown as arrow '4') at the angle θ$_2$ relative to the normal 112N. In some embodiments, light 3 is refracted and propagates within the first image-side polyhedron 110 (light 4) generally parallel to the inward facing side 116 and/or outward facing side 118. Since the light exit side 114 is oriented parallel to the light entrance side 112, light 4 is incident on the light exit side 114 at the angle θ$_2$ relative to a normal 114N of the light exit side 114 and is refracted at the light exit side 114 at the angle θ$_1$ relative to the normal 114N (shown as arrow '5'). Accordingly, light 5 propagates parallel to light 1.

Referring again to FIG. 1, in embodiments, the first and second object-side polyhedrons 100, 120 and the first and second image-side polyhedrons 110, 130 may be adjacent to and in contact with each other at the reference optical axis 16 as depicted in the figure. In other embodiments, the first and second object-side polyhedrons 100, 120, and/or the first and second image-side polyhedrons 110, 130 may be spaced apart from each other. That is, lines 101, 121 of the first and second object-side polyhedrons 100, 120, and/or lines 117, 137 of the first and second image-side polyhedrons 110, 130 may be spaced apart from and not in contact with each other at the reference optical axis 16. In such embodiments, an image of the portion of the object O positioned above (+Y direction) the uncloaked region is not provided on the image side 14 of the cloaking assembly 10.

Still referring to FIG. 1, light from the object O on the first side (+X direction) of the reference optical axis 16 travels from the object-side 12 around the cloaked region CR and forms a portion of an image 'I' on the image-side 14 via refraction by the first object-side polyhedron 100 and the first image-side polyhedron 110. Particularly, light 1 travels from the object O and is incident on the light entrance side 102 of the first object-side polyhedron 100, propagates through and is refracted by the light entrance side 102 as light 2. Light 2 propagates to the light exit side 104, without internal reflection, and propagates through and is refracted by the light exit side 104 as light 3. Light 3 propagates to the light entrance side 112 of the first image-side polyhedron 110. Light 3 propagates through and is refracted by the light entrance side 112 of the first image-side polyhedron 110 as light 4. Light 4 propagates to the light exit side 114, without internal reflection, and propagates through and is refracted by the light exit side 114 as light 5. Light 5 propagates parallel to light 1 and forms the image I of the object O corresponding to the portion positioned to the right (+X-direction) of the reference optical axis 16. Accordingly, light from the object O may travel from the object-side 12 to the image-side 14 via the optical path: object O—light entrance side 102 of the first object-side polyhedron 100—light exit side 104 of the first object-side polyhedron 100—light entrance side 112 of the first image-side polyhedron 110—light exit side 114 of the first image-side polyhedron 110—image I.

Light from the object O on the second side (−X direction) of the reference optical axis 16 travels from the object-side 12 around the cloaked region CR and forms a portion of an image 'I' on the image-side 14 via refraction by the second object-side polyhedron 120 and the second image-side polyhedron 130. Particularly, light 1 travels from the object O and is incident on the light entrance side 122 of the second object-side polyhedron 120, propagates through and is refracted by the light entrance side 122 as light 2. Light 2 propagates to the light exit side 124, without internal reflection, and propagates through and is refracted by the light exit side 124 as light 3. Light 3 propagates to the light entrance side 132 of the second image-side polyhedron 130. Light 3 propagates through and is refracted by the light entrance side 132 of the second image-side polyhedron 130 as light 4. Light 4 propagates to the light exit side 134, without internal reflection, and propagates through and is refracted by the light exit side 134 as light 5. Light 5 propagates parallel to light 1 and forms the image I of the object O corresponding to the portion positioned to the left (−X-direction) of the reference optical axis 16. Accordingly, light from the object O may travel from the object-side 12 to the image-side 14 via the optical path: object O—light entrance side 122 of the second object-side polyhedron 120—light exit side 124 of the second object-side polyhedron 120—light entrance side 132 of the second image-side polyhedron 130—light exit side 134 of the second image-side polyhedron 130—image I.

In combination, light from the object O on the object-side 12 travels around the cloaked region CR and forms the image 'I' on the image-side 14 via refraction by the polyhedrons 100, 110, 120, 130. Particularly, light 1 travels from the object O and is incident on the light entrance sides 102, 122 of the first and second object-side polyhedrons 100, 120, respectively, and propagates through and is refracted by the light entrance sides 102, 122 as light 2. Light 2 propagates to the light exit sides 104, 124 of the first and second object-side polyhedrons 100, 120, respectively, and propagates through and is refracted by the light exit sides 104, 124 as light 3. Light 3 propagates to the light entrance sides 112, 132 of the first and second image-side polyhedrons 110, 130, respectively, and propagates through and is refracted by the light entrance sides 112, 132 as light 4. Light 4 propagates to the light exit sides 114, 134 of the first and second image-side polyhedrons 110, 130, respectively, and propagates through and is refracted by the light exit sides 114, 134 as light 5. Light 5 propagates parallel to light 1 and forms the image I of the object O. Accordingly, light from the object O may travel from the object-side 12 to the image-side 14 via the optical path: object O—light entrance sides 102, 122 of the first and second object-side polyhedrons 100, 120, respectively—light exit sides 104, 124 of the first and second object-side polyhedrons 100, 120, respectively—light entrance sides 112, 132 of the first and second image-side polyhedrons 110, 130, respectively—light exit sides 114, 134 of the first and second image-side polyhedrons 110, 130, respectively—image I.

It should be understood that the cloaking assembly 10 may cloak an object within the cloaked region CR including only the two polyhedrons 100, 110 or only the two polyhedrons 120, 130. That is, an object positioned on the first side (+X direction) of the reference optical axis 16 within the cloaked region CR would be cloaked by the two polyhedrons 100, 110. In the alternative, an object positioned on the second side (−X direction) of the reference optical axis 16 within the cloaked region CR would be cloaked by the two polyhedrons 120, 130.

Figure 5:
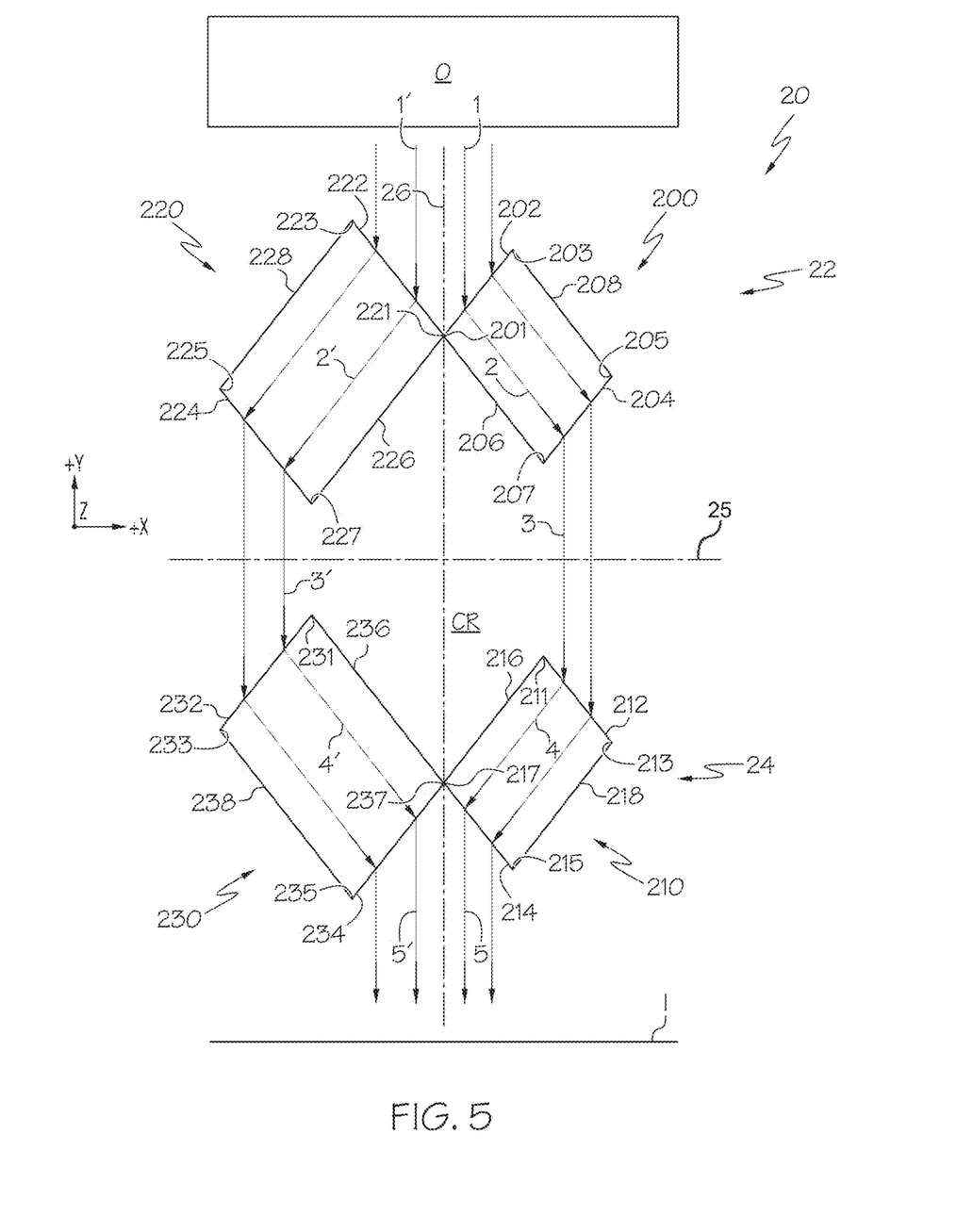
FIG. 5 schematically depicts a top view of a cloaking device according to one or more embodiments described and illustrated herein.

Although FIG. 1 depicts the first and second object-side polyhedrons 100, 120, being of the same size and the first and second image-side polyhedrons 110, 130 being of the same size, i.e., the lengths of the light entrance sides 102, 122 and 112, 132 are equal, the lengths of the light exit sides 104, 124 and 114 and 134 are equal, etc., in some embodiments, the first and second object-side polyhedrons 100, 120 are not the same size and the first and second image-side polyhedrons 110, 130 are not the same size. Particularly, FIG. 5 depicts a cloaking assembly 20 with polyhedrons of different sizes. The cloaking assembly 20 includes an object-side 22, an image-side 24, first and second object-side polyhedrons 200, 220, and first and second image-side polyhedrons 210, 230. The first object-side polyhedron 200 and the first image-side polyhedron 210 on the first side (+X direction) of a reference optical axis 26 are smaller than the second object-side polyhedron 220 and the second image-side polyhedron 230, respectively, on the second side (−X direction) of the reference optical axis 26 as discussed in greater detail below. A cloaked region CR is positioned between the first and second object-side polyhedrons 200, 220 and the first and second image-side polyhedrons 210, 230, and a bisecting axis 25 generally divides or designates the object-side 22 and the image-side 24 of the cloaking assembly 20. The first object-side polyhedron 200 and the first image-side polyhedron 210 are positioned on a first side (+X direction) of the reference optical axis 26 and the second object-side polyhedron 220 and the second image-side polyhedron 230 are positioned on a second side (−X direction) of the reference optical axis 26 opposite the first side.

The first object-side polyhedron 200 includes a light entrance side 202 and a light exit side 204. Extending between the light entrance side 202 and the light exit side 204 is an inward facing side 206 and outward facing side 208. A plane defined by the light entrance side 202 and a plane defined by the inward facing side 206 intersect at a line 201 extending in the Z-direction, and a plane defined by the light entrance side 202 and a plane defined by the outward facing side 208 intersect at a line 203 extending in the Z-direction. A plane defined by the light exit side 204 and a plane defined by the outward facing side 208 intersect at a line 205 extending in the Z-direction, and a plane defined by the light exit side 204 and a plane defined by the inward facing side 206 intersect at a line 207 extending in the Z-direction.

The first image-side polyhedron 210 includes a light entrance side 212 and a light exit side 214. Extending between the light entrance side 212 and the light exit side 214 is an inward facing side 216 and outward facing side 218. A plane defined by the light entrance side 212 and a plane defined by the inward facing side 216 intersect at a line 211 extending in the Z-direction, and a plane defined by the light entrance side 212 and a plane defined by the outward facing side 218 intersect at a line 213 extending in the Z-direction. A plane defined by the light exit side 214 and a plane defined by the outward facing side 218 intersect at a line 215 extending in the Z-direction, and a plane defined by the light exit side 214 and a plane defined by the inward facing side 216 intersect at a line 217 extending in the Z-direction.

The second object-side polyhedron 220 includes a light entrance side 222 and a light exit side 224. Extending between the light entrance side 222 and the light exit side 224 is an inward facing side 226 and outward facing side 228. A plane defined by the light entrance side 222 and a plane defined by the inward facing side 226 intersect at a line 221 extending in the Z-direction, and a plane defined by the light entrance side 222 and a plane defined by the outward facing side 228 intersect at a line 223 extending in the Z-direction. A plane defined by the light exit side 224 and a plane defined by the outward facing side 228 intersect at a line 225 extending in the Z-direction, and a plane defined by the light exit side 224 and a plane defined by the inward facing side 226 intersect at a line 227 extending in the Z-direction.

The second image-side polyhedron 230 includes a light entrance side 232 and a light exit side 234. Extending between the light entrance side 232 and the light exit side 234 is an inward facing side 236 and outward facing side 238. A plane defined by the light entrance side 232 and a plane defined by the inward facing side 236 intersect at a line 231 extending in the Z-direction, and a plane defined by the light entrance side 232 and a plane defined by the outward facing side 238 intersect at a line 233 extending in the Z-direction. A plane defined by the light exit side 234 and a plane defined by the outward facing side 238 intersect at a line 235 extending in the Z-direction, and a plane defined by the light exit side 234 and a plane defined by the inward facing side 236 intersect at a line 237 extending in the Z-direction.

As depicted in FIG. 5, the distance between the inward facing side 206 and outward facing side 208 of the first object-side polyhedron 200 is less than the distance between the inward facing side 226 and the outward facing side 228 of the second object-side polyhedron 220. That is, the lengths of the light entrance side 202 and the light exit side 204 between the inward facing surface 206 and the outward facing surface 208, are less than the lengths of the light entrance side 222 and the light exit side 224. Also, the distance between the light entrance side 202 and light exit side 204 of the first object-side polyhedron 200 is less than the distance between the light entrance side 222 and the light exit side 224 of the second object-side polyhedron 220. Similarly, the distance between the inward facing side 216 and outward facing side 218 of the first image-side polyhedron 210 is less than the distance between the inward facing side 236 and the outward facing side 238 of the second image-side polyhedron 230. Also, the distance between the light entrance side 212 and light exit side 214 of the first image-side polyhedron 210 is less than the distance between the light entrance side 232 and the light exit side 234 of the second image-side polyhedron 230. Accordingly, the cloaking assembly 20 comprises a field of view on the first side (+X direction) of the reference optical axis 26 that is less than a field of view on the second side (−X direction) of the reference optical axis 26.

Similar to the polyhedrons 100, 110, 120, 130 of the cloaking assembly 10 depicted in FIG. 1, in embodiments, the polyhedrons 200, 210, 220, 230 may be hexahedrons. In the alternative, one or more of the polyhedrons 200, 210, 220, 230 may not be hexahedrons so long as the light exit side is parallel to the light entrance side. In embodiments where one or more of the polyhedrons 200, 210, 220, 230 is a hexahedron, the hexahedron may be a parallelepiped. Also, each of the polyhedrons 200, 210, 220, 230 may include a pair of opposing acute angles γ and a pair of opposing obtuse angles β. In embodiments, the light entrance side 202 of the first object-side polyhedron 200 may be oriented CW relative to the reference optical axis 26 at an angle α (not shown) and the light exit side 214 of the first image-side polyhedron 210 may oriented CW relative to the reference optical axis 26 CW at the angle equal to 180°−α (not shown). Also, the light entrance side 212 of the first image-side polyhedron 210 may be spaced apart from and oriented CW relative to the light exit side 204 of the first object-side polyhedron 200 at an angle equal to 180°−2α. It should be understood that the light entrance side 222 of the second object-side polyhedron 220 may be oriented relative to the reference optical axis 26 CCW at the angle α, the light exit side 234 of the second image-side polyhedron 230 may be oriented relative to the reference optical axis 26 CCW at the angle equal to 180°−α, and the light entrance side 232 of the second image-side polyhedron 230 may be spaced apart from and oriented CCW relative to the light exit side 224 of the second object-side polyhedron 220 at an angle equal to 180°−2α.

In embodiments, the first and second object-side polyhedrons 200, 220, and the first and second image-side polyhedrons 210, 230 may be adjacent to and in contact with each other at the reference optical axis 26 as depicted in FIG. 5. In other embodiments, the first and second object-side polyhedrons 200, 220, and/or the first and second image-side polyhedrons 210, 230 may be spaced apart from each other. That is, lines 201, 221 of the first and second object-side polyhedrons 200, 220, and/or lines 217, 237 of the first and second image-side polyhedrons 210, 230 may be spaced apart from and not in contact with each other at the reference optical axis 26. In such embodiments, an image of the portion of the object O positioned above (+Y direction) the uncloaked region is not provided on the image side 24 of the cloaking assembly 20.

Still referring to FIG. 5, light from the object O on the first side (+X direction) of the reference optical axis 26 travels from the object-side 22 around the cloaked region CR and forms a portion of an image 'I' on the image-side 24 via refraction by the first object-side polyhedron 200 and the first image-side polyhedron 210. Particularly, light 1 travels from the object O and is incident on the light entrance side 202 of the first object-side polyhedron 200, propagates through and is refracted by the light entrance side 202 as light 2. Light 2 propagates to the light exit side 204, without internal reflection, and propagates through and is refracted by the light exit side 204 as light 3. Light 3 propagates to the light entrance side 212 of the first image-side polyhedron 210. Light 3 propagates through and is refracted by the light entrance side 212 of the first image-side polyhedron 210 as light 4. Light 4 propagates to the light exit side 214 without internal reflection, and propagates through and is refracted by the light exit side 214 as light 5. Light 5 propagates parallel to light 1 and forms the image I of the object O corresponding to the portion positioned to the right (+X-direction) of the reference optical axis 26. Accordingly, light from the object O may travel from the object-side 22 to the image-side 24 via the optical path: object O—light entrance side 202 of the first object-side polyhedron 200—light exit side 204 of the first object-side polyhedron 200—light entrance side 212 of the first image-side polyhedron 210—light exit side 214 of the first image-side polyhedron 210—image I.

Light from the object O on the second side (−X direction) of the reference optical axis 26 travels from the object-side 22 around the cloaked region CR and forms a portion of an image 'I' on the image-side 24 via refraction by the second object-side polyhedron 220 and the second image-side polyhedron 230. Particularly, light 1' travels from the object O and is incident on the light entrance side 222 of the second object-side polyhedron 220, propagates through and is refracted by the light entrance side 222 as light 2'. Light 2' propagates to the light exit side 224 without internal reflection, and propagates through and is refracted by the light exit side 224 as light 3'. Light 3' propagates to the light entrance side 232 of the second image-side polyhedron 230. Light 3' propagates through and is refracted by the light entrance side 232 of the second image-side polyhedron 230 as light 4'. Light 4' propagates to the light exit side 234 without internal reflection, and propagates through and is refracted by the light exit side 234 as light 5'. Light 5' propagates parallel to light 1 and forms the image I of the object O corresponding to the portion positioned to the left (−X-direction) of the reference optical axis 26. Accordingly, light from the object O may travel from the object-side 22 to the image-side 24 via the optical path: object O—light entrance side 222 of the second object-side polyhedron 220—light exit side 224 of the second object-side polyhedron 220—light entrance side 232 of the second image-side polyhedron 230—light exit side 234 of the second image-side polyhedron 230—image I.

In combination, light from the object O on the object-side 22 travels around the cloaked region CR and forms the image 'I' on the image-side 24 via refraction by the polyhedrons 200, 210, 220, 230. Particularly, light 1 and 1' travel from the object O and are incident on the light entrance sides 202, 222 of the first and second object-side polyhedrons 200, 220, respectively, and propagate through and are refracted by the light entrance sides 202, 222 as light 2 and 2', respectively. Light 2 and 2' propagate to the light exit sides 204, 224 of the first and second object-side polyhedrons 200, 220, respectively, and propagate through and are refracted by the light exit sides 204, 224 as light 3 and 3', respectively. Light 3 and 3' propagate to the light entrance sides 212, 232 of the first and second image-side polyhedrons 210, 230, respectively, and propagate through and are refracted by the light entrance sides 212, 232 as light 4 and 4', respectively. Light 4 and 4' propagate to the light exit sides 214, 234 of the first and second image-side polyhedrons 210, 230, respectively, and propagate through and are refracted by the light exit sides 214, 234 as light 5 and 5', respectively. Light 5 and 5' propagate parallel to light 1 and 1' and form the image I of the object O. Accordingly, light from the object O may travel from the object-side 22 to the image-side 24 via the optical path: object O—light entrance sides 202, 222 of the first and second object-side polyhedrons 200, 220, respectively—light exit sides 204, 224 of the first and second object-side polyhedrons 200, 220, respectively—light entrance sides 212, 232 of the first and second image-side polyhedrons 210, 230, respectively—light exit sides 214, 234 of the first and second image-side polyhedrons 210, 230, respectively—image I.

It should be understood that the cloaking assembly 20 may cloak an object within the cloaked region CR including only the two polyhedrons 200, 210 or only the two polyhedrons 220, 230. That is, an object positioned on the first side (+X direction) of the reference optical axis 26 within the cloaked region CR would be cloaked by the two polyhedrons 200, 210. In the alternative, an object positioned on the second side (−X direction) of the reference optical axis 26 within the cloaked region CR would be cloaked by the two polyhedrons 220, 230.

Figure 6:
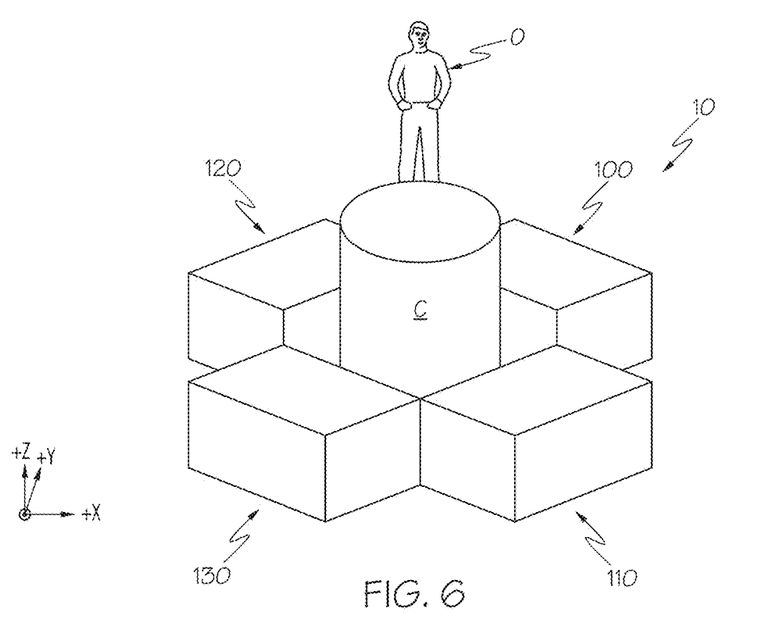
FIG. 6 schematically depicts a top perspective view of the cloaking device of FIG. 1 with a first object on one side of the cloaking device and a second object within a cloaked region of the cloaking device.
Figure 7:
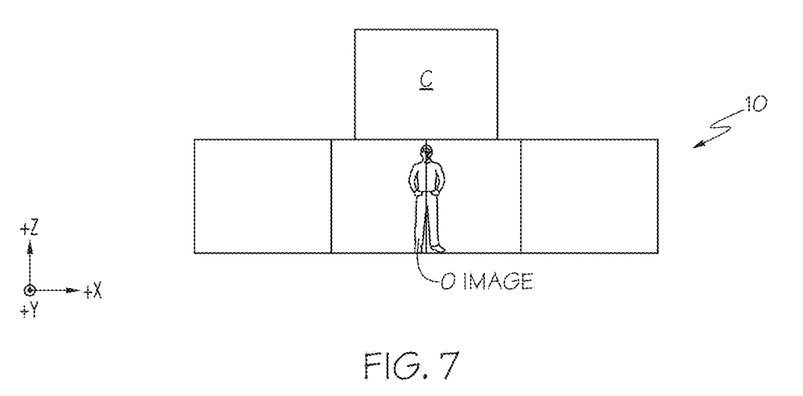
FIG. 7 schematically depicts a side view of the cloaking device of FIG. 6 with the first object on one side of the cloaking device and the second object within the cloaked region of the cloaking device.

Referring now to FIGS. 1, 6 and 7, a top perspective view and a side view of a cloaking device according to embodiments described herein are shown in FIGS. 6 and 7, respectively. Specifically, FIG. 6 is a top perspective view of an article in the form of a column 'C' within the cloaked region CR of the cloaking assembly 10 (FIG. 1) and an object 'O' (e.g., a person) located behind the column C on the object-side 12 of the cloaking assembly 10 in the +Y direction. The column C has a height dimension in the Z direction (increasing height in the +Z direction) greater than the height h of the cloaking device. FIG. 7 is a side view from the +Y direction of the cloaking assembly 10 shown in FIG. 6 and shows the portion of the column C that is within the cloaked region CR is not visible and the object O located behind the column C in the +Y direction is visible to an observer viewing the cloaking assembly 10 in the +Y direction. Accordingly, the column C positioned within the cloaked region CR is not visible to an observer viewing the image-side 14 of the cloaking assembly 10 and an image of the object O is visible to the observer viewing the image-side 14. Although column C in FIGS. 6-7 is separate from the inward facing sides 106, 116, 126, 136 (FIG. 1), i.e., column C is a separate object from the cloaking assembly 10, it should be appreciated that column C may be structurally part of the cloaking assembly 10 and have an outer surface that provides or is equivalent to inward facing sides 106, 116, 126, 136 (FIG. 1).

Figure 8:
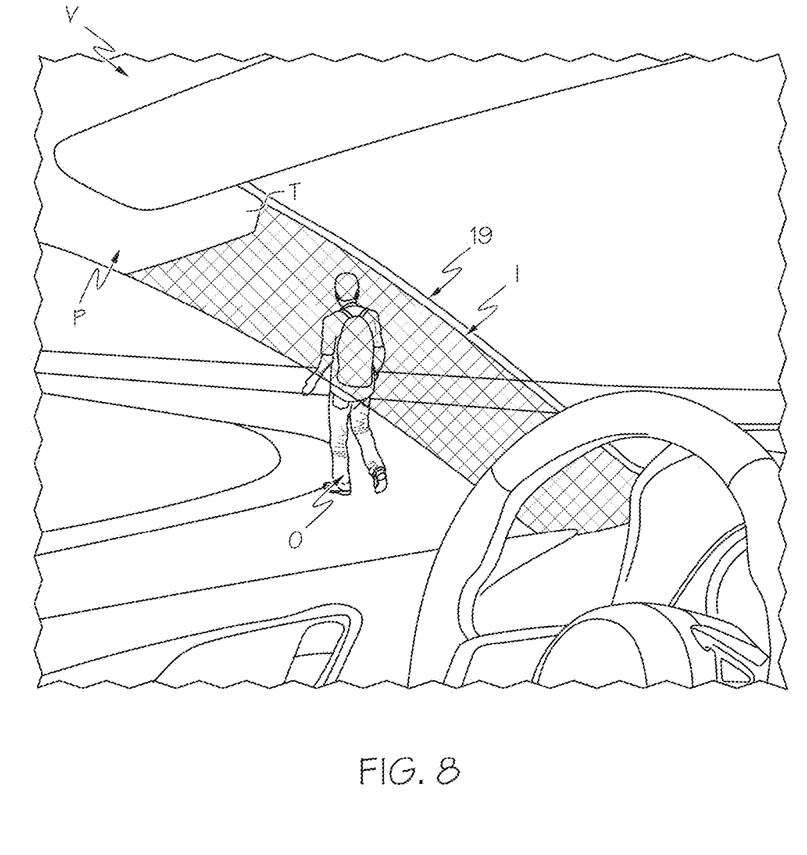
FIG. 8 schematically depicts a side view of a cloaking device cloaking an A-pillar of a vehicle according to one or more embodiments described and illustrated herein.

Referring to FIG. 8, embodiments of an A-pillar of a vehicle being cloaked by a cloaking device are shown. Particularly, FIG. 8 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

Example

Figure 9A:
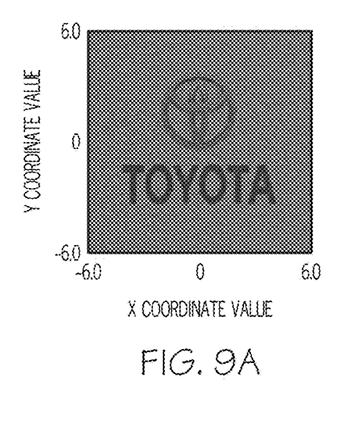
FIG. 9A depicts a computer simulated cloaking image for a cloaking assembly according to the embodiments of FIG. 1 with the first object-side polyhedron and the first image-side polyhedron each comprising a refractive index equal to 2.0 and a 0° misalignment between a reference optical axis and a viewing angle of the cloaking assembly.
Figure 9B:
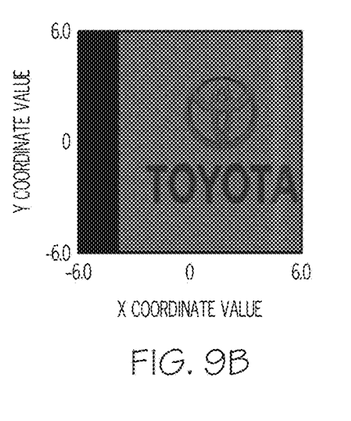
FIG. 9B depicts a computer simulated cloaking image for a cloaking assembly according to the embodiments of FIG. 1 with the first object-side polyhedron and the first image-side polyhedron each comprising a refractive index equal to 2.0 and a 1° misalignment between a reference optical axis and a viewing angle of the cloaking assembly.
Figure 9C:
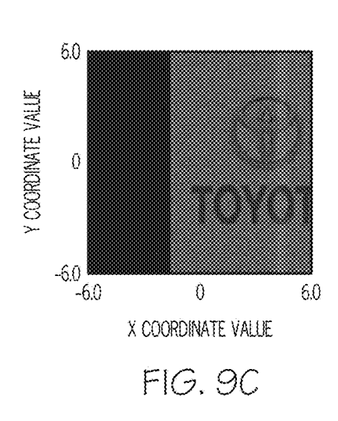
FIG. 9C depicts a computer simulated cloaking image for a cloaking assembly according to the embodiments of FIG. 1 with the first object-side polyhedron and the first image-side polyhedron each comprising a refractive index equal to 2.0 and a 2° misalignment between a reference optical axis and a viewing angle of the cloaking assembly.
Figure 9D:
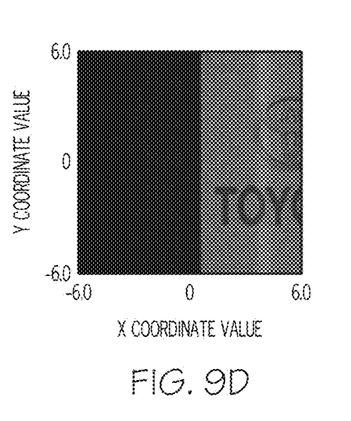
FIG. 9D depicts a computer simulated cloaking image for a cloaking assembly according to the embodiments of FIG. 1 with the first object-side polyhedron and the first image-side polyhedron each comprising a refractive index equal to 2.0 and a 3° misalignment between a reference optical axis and a viewing angle of the cloaking assembly.

Referring now to FIGS. 9A-9D, images of an object in the form of an emblem positioned on the object-side 12 of the cloaking assembly 10 and as viewed from the image-side 14 simulated using a commercial software program (Zemax OpticStudio) are depicted. The emblem was positioned only on the first side (+X direction) of the reference optical axis 16. The polyhedrons 100, 110 were formed from LASF35 glass with an index of refraction equal to 2.0. The polyhedrons 100, 110, were parallelepipeds with opposing acute angles γ equal to 65° and opposing obtuse angles β equal to 115°. The light entrance side 102 of the first object-side polyhedron 100 was oriented relative to the reference optical axis 16 CW at an angle α equal to 30°, the light exit side 114 of the first image-side polyhedron 110 was oriented relative to the reference optical axis 16 CW at an angle equal to 180°−α equal to 150°, and the light entrance side 112 of the first image-side polyhedron 110 was oriented relative to the light exit side 104 of the first object-side polyhedron 100 CW at the angle equal to 180°-2α equal to 120°. FIG. 9A depicts an image of the object with no misalignment (0°) between the reference optical axis 16 and a viewing angle of the cloaking assembly 10. That is, as used herein, the term misalignment refers to an angle defined by the reference optical axis of a cloaking assembly and a line of sight of an observer viewing the cloaking assembly from the image-side as depicted by the +Y direction in the figures (also referred to herein as a "viewing angle"). FIG. 9B depicts an image of the object with a 1° misalignment between the reference optical axis 16 and a viewing angle of the cloaking assembly 10. FIG. 9C depicts an image of the object with a 2° misalignment between the reference optical axis 16 and a viewing angle of the cloaking assembly 10. FIG. 9D depicts an image of the object with a 3° misalignment between the reference optical axis 15 and a viewing angle of the cloaking assembly 10. As shown by the images in FIGS. 9A-9D, an image of the object on the object-side 12 of the cloaking assembly 10 can be seen clearly with up to 2° of misalignment and is still visible with up to 3° of misalignment. Accordingly, an observer can view or "see" the object O through the cloaked region CR even if the observer is not looking directly along the reference optical axis 16 of the cloaking assembly 10. It should be understood that the angular dependent characteristics of the cloaking assembly 10 can be further improved using transparent materials with a higher index of refraction, for example and without limitation TiO$_2$ (n≈2.5), ZnS (n≈2.4) and ZnSe (n≈2.6). Also, reflection loss can be mitigated with anti-reflective coatings and color fringes appearing in the output images at oblique angles of incidence can be minimized by using glass materials with high Vd (i.e., low dispersion), such as N-PK52 (n=1.497, Vd=81.63) and N-FK56 (n=1.434, Vd=94.95) while sacrificing angular independent performance.

Figure 10A:
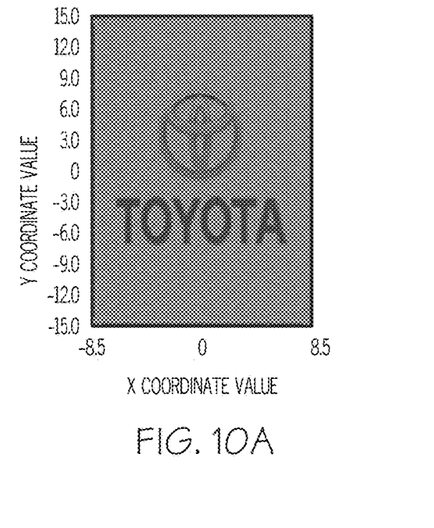
FIG. 10A depicts a computer simulated cloaking image for a cloaking assembly according to the embodiments of FIG. 1 with the first object-side polyhedron and the first image-side polyhedron each comprising a refractive index equal to 1.41 and a 0° misalignment between a reference optical axis and a viewing angle of the cloaking assembly.
Figure 10B:
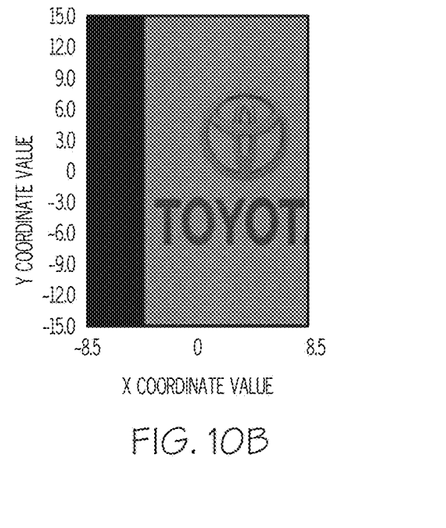
FIG. 10B depicts a computer simulated cloaking image for a cloaking assembly according to the embodiments of FIG. 1 with the first object-side polyhedron and the first image-side polyhedron each comprising a refractive index equal to 1.41 and a 1° misalignment between a reference optical axis and a viewing angle of the cloaking assembly.
Figure 10C:
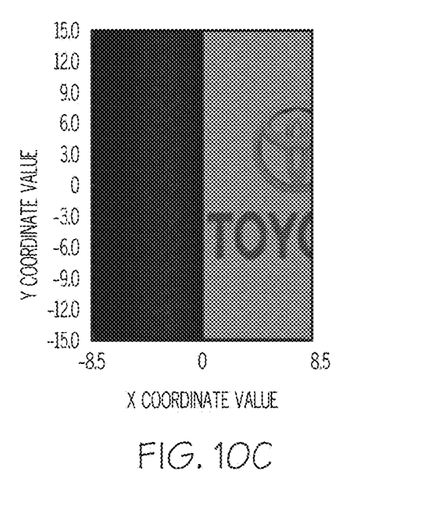
FIG. 10C depicts a computer simulated cloaking image for a cloaking assembly according to the embodiments of FIG. 1 with the first object-side polyhedron and the first image-side polyhedron each comprising a refractive index equal to 1.41 and a 2° misalignment between a reference optical axis and a viewing angle of the cloaking assembly.
Figure 10D:
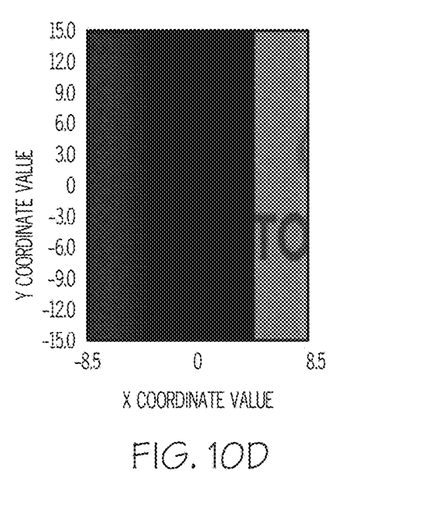
FIG. 10D depicts a computer simulated cloaking image for a cloaking assembly according to the embodiments of FIG. 1 with the first object-side polyhedron and the first image-side polyhedron each comprising a refractive index equal to 1.41 and a 3° misalignment between a reference optical axis and a viewing angle of the cloaking assembly.

Referring now to FIGS. 10A-10D, images of an object in the form of an emblem positioned on the object-side 12 of the cloaking assembly 10 and as viewed from the image-side 14 simulated using the Zemax OpticStudio software program are depicted. The emblem was positioned only on the first side (+X direction) of the reference optical axis 16. The polyhedrons 100, 110 were formed from polydimethylsiloxane (PDMS) with an index of refraction equal to 1.41. The polyhedrons 100, 110, were parallelepipeds with opposing acute angles γ equal to 48° and opposing obtuse angles β equal to 132°. The light entrance side 102 of the first object-side polyhedron 100 was oriented relative to the reference optical axis 16 CW at an angle α equal to 28°, the light exit side 114 of the first image-side polyhedron 110 was oriented relative to the reference optical axis 16 CW at an angle equal to 180°−α equal to 152°, and the light entrance side 112 of the first image-side polyhedron 110 was oriented relative to the light exit side 104 of the first object-side polyhedron 100 CW at the angle equal to 180°-2α equal to 124°. FIG. 10A depicts an image of the object with no misalignment (0°) between the reference optical axis 16 and a viewing angle of the cloaking assembly 10. FIG. 10B depicts an image of the object with a 1° misalignment between the reference optical axis 16 and a viewing angle of the cloaking assembly 10. FIG. 10C depicts an image of the object with a 2° misalignment between the reference optical axis 16 and a viewing angle of the cloaking assembly 10. FIG. 10D depicts an image of the object with a 3° misalignment between the reference optical axis 15 and a viewing angle of the cloaking assembly 10. As shown by the images in FIGS. 10A-10D, an image of the object on the object-side 12 of the cloaking assembly 10 can be seen clearly with up to 1° of misalignment and is still visible with up to 2° of misalignment. Accordingly, an observer can view or "see" the object O through the cloaked region CR even if the observer is not looking directly along the reference optical axis 16 of the cloaking assembly 10.

The cloaking devices described herein may be used to cloak vehicle articles such as a vehicle A-pillar, B-pillar, C-pillar, D-pillar, etc., and remove a "blind spot" caused by the vehicle article. It will be understood that the term "blind spot" as used herein refers to an area around the vehicle that cannot be directly observed by a driver while operating the vehicle. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
an object-side, an image-side, a cloaked region between the object-side and the image-side, and a reference optical axis extending from the object-side to the image-side;
an object-side polyhedron comprising a light entrance side and a light exit side oriented parallel to the light entrance side; and
an image-side polyhedron comprising a light entrance side and a light exit side oriented parallel to the light entrance side;
wherein:
the light entrance side of the object-side polyhedron is oriented relative to the reference optical axis at an acute angle α;
the light exit side of the image-side polyhedron is oriented relative to the reference optical axis at an oblique angle equal to 180°−α;
the light entrance side of the image-side polyhedron is spaced apart from the light exit side of the object-side polyhedron; and
light from an object positioned on the object-side of the cloaking device and obscured by the cloaked region from the image-side is redirected around the cloaked region via propagation of the light through the object-side polyhedron to the image-side polyhedron and through the image-side polyhedron forming an image of the object on the image-side of the cloaking device such that the light from the object appears to pass through the cloaked region.

2. The cloaking device of claim 1, wherein cross-sections along height directions of the object-side polyhedron and the image-side polyhedron comprises two equivalent parallelograms.

3. The cloaking device of claim 1, wherein the light entrance side of the image-side polyhedron is oriented relative to the light exit side of the object-side polyhedron at an angle equal to 180°-2α.

4. The cloaking device of claim 1, wherein light from the object positioned on the object-side of the cloaking device is redirected around the cloaked region and forms the image of the object on the image-side of the cloaking device without total internal reflection of the light within the object-side polyhedron and the image-side polyhedron.

5. The cloaking device of claim 1, wherein light from the object on the object-side propagates to the image-side to form the image via an optical path:
object to light entrance side of the object-side polyhedron;
light entrance side of the object-side polyhedron to light exit side of the object-side polyhedron;
light exit side of the object-side polyhedron to light entrance side of the image-side polyhedron;
light entrance side of the image-side polyhedron to light exit side of the image-side polyhedron; and
light exit side of the image-side polyhedron to image on the image-side.

6. The cloaking device of claim 1, wherein the object-side polyhedron and the image-side polyhedron are hexahedrons.

7. The cloaking device of claim 1, wherein the object-side polyhedron and the image-side polyhedron are parallelepipeds.

8. A cloaking device assembly comprising:
an object-side, an image-side, a cloaked region, a cloaked article positioned within the cloaked region, and a reference optical axis extending from the object-side to the image-side;
a first object-side polyhedron positioned on a first side of the reference optical axis and a second object-side polyhedron positioned on a second side of the reference optical axis opposite the first side, the first and second object-side polyhedrons each comprising a light entrance side and a light exit side oriented parallel to the light entrance side; and
a first image-side polyhedron positioned on the first side of the reference optical axis and a second image-side polyhedron positioned on the second side of the reference optical axis opposite the first side, the first and second image-side polyhedrons each comprising a light entrance side and a light exit side oriented parallel to the light entrance side;
wherein:
the light entrance sides of the first and second object-side polyhedrons are oriented relative to the reference optical axis at acute angles α and −α, respectively;
the light exit sides of the first and second image-side polyhedrons are oriented relative to the reference optical axis at oblique angles equal to 180°−α and 180°+α, respectively;
the light entrance sides of the first and second image-side polyhedrons are spaced apart from the light exit sides of the first and second object-side polyhedrons, respectively; and
light from an object positioned on the object-side of the cloaking device assembly and obscured by the cloaked region from the image-side is redirected around the cloaked region via propagation of the light through the first and second object-side polyhedrons to the first and second image-side polyhedrons, respectively, and through the first and second image-side polyhedrons forming an image of the object on the image-side of the cloaking device assembly such that the light from the object appears to pass through the cloaked region.

9. The cloaking device assembly of claim 8, wherein cross-sections along height directions of the first and second object-side polyhedrons and the first and second image-side polyhedrons comprises four equivalent parallelograms.

10. The cloaking device assembly of claim 9, wherein the light entrance sides of the first and second image-side polyhedrons are oriented relative to the light exit sides of the first and second object-side polyhedrons, respectively, at an angle equal to 180°-2α.

11. The cloaking device assembly of claim 8, wherein light from the object positioned on the object-side of the cloaking device assembly is redirected around the cloaked region and forms the image of the object on the image-side of the cloaking device assembly without total internal reflection of the light within the first and second object-side polyhedrons and the first and second image-side polyhedrons.

12. The cloaking device assembly of claim 8, wherein light from the object on the object-side propagates to the image-side to form the image via an optical path:
object to light entrance sides of the first and second object-side polyhedrons;
light entrance sides of the first and second object-side polyhedrons to light exit sides of the first and second object-side polyhedrons, respectively;
light exit sides of the first and second object-side polyhedrons to light entrance sides of the first and second image-side polyhedrons, respectively;

light entrance sides of the first and second image-side polyhedrons to light exit sides of the first and second image-side polyhedrons, respectively; and light exit sides of the first and second image-side polyhedrons to image on the image-side.

13. The cloaking device assembly of claim 8, wherein the first and second object-side polyhedrons and the first and second image-side polyhedrons are hexahedrons.

14. The cloaking device assembly of claim 8, wherein the first and second object-side polyhedrons and the first and second image-side polyhedrons are parallelepipeds.

15. The cloaking device assembly of claim 8, wherein the first object-side polyhedron and the first image-side polyhedron are equivalent parallelepipeds and the second object-side polyhedron and the second image-side polyhedron are equivalent parallelepipeds.

16. A vehicle comprising:
an A-pillar; and
a cloaking device positioned on the A-pillar, the cloaking device comprising:
an object-side, an image-side, a cloaked region and a reference optical axis extending from the object-side to the image-side, wherein the A-pillar is positioned within the cloaked region, the object-side is positioned on an exterior of the vehicle and the image-side is positioned within an interior of the vehicle;
an object-side polyhedron comprising a light entrance side and a light exit side oriented parallel to the light entrance side; and
an image-side polyhedron comprising a light entrance side and a light exit side oriented parallel to the light entrance side;
wherein:
the light entrance side of the object-side polyhedron is oriented relative to the reference optical axis at an acute angle $\alpha$;
the light exit side of the image-side polyhedron is oriented relative to the reference optical axis at an oblique angle equal to $180°-\alpha$;
the light entrance side of the image-side polyhedron is spaced apart from the light exit side of the object-side polyhedron; and
light from an object positioned on the object-side of the cloaking device and obscured by the A-pillar is redirected around the A-pillar via propagation of the light through the object-side polyhedron to the image-side polyhedron and through the image-side polyhedron forming an image of the object on the image-side of the cloaking device such that the light from the object appears to pass through the A-pillar.

17. The vehicle of claim 16, wherein cross-sections along height directions of the object-side polyhedron and the image-side polyhedron comprises two equivalent parallelograms.

18. The vehicle of claim 17, wherein the light entrance side of the image-side polyhedron is oriented relative to the light exit side of the object-side polyhedron at an angle equal to $180°-2\alpha$.

19. The vehicle of claim 16, wherein light from the object positioned on the object-side of the cloaking device is redirected around the A-pillar and forms the image of the object on the image-side of the cloaking device without total internal reflection of the light within the object-side polyhedron and the image-side polyhedron.

20. The vehicle of claim 16, wherein light from the object on the object-side propagates to the image-side to form the image via an optical path:
object to light entrance side of the object-side polyhedron;
light entrance side of the object-side polyhedron to light exit side of the object-side polyhedron;
light exit side of the object-side polyhedron to light entrance side of the image-side polyhedron;
light entrance side of the image-side polyhedron to light exit side of the image-side polyhedron; and
light exit side of the image-side polyhedron to image on the image-side.

\* \* \* \* \*

UNITED STATES PATENT AND TRADEMARK OFFICE
CERTIFICATE OF CORRECTION

PATENT NO. : 10,345,605 B2
APPLICATION NO. : 15/813845
DATED : July 9, 2019
INVENTOR(S) : Kyu-Tae Lee et al.

It is certified that error appears in the above-identified patent and that said Letters Patent is hereby corrected as shown below:

In the Specification

In Column 8, Line 12, delete "$O_2$" and insert --$\Theta_2$--, therefor.

Signed and Sealed this
Twenty-seventh Day of August, 2019

Andrei Iancu
*Director of the United States Patent and Trademark Office*